US006960072B1

(12) United States Patent
Hepler

(10) Patent No.: US 6,960,072 B1
(45) Date of Patent: Nov. 1, 2005

(54) HOT SPRUE BUSHING

(75) Inventor: Douglas C. Hepler, Rochester, NY (US)

(73) Assignee: Polyshot Corporation, West Henrietta, NY (US)

(*) Notice: Subject to any disclaimer, the term of this patent is extended or adjusted under 35 U.S.C. 154(b) by 191 days.

(21) Appl. No.: 10/461,064

(22) Filed: Jun. 12, 2003

Related U.S. Application Data

(60) Provisional application No. 60/390,485, filed on Jun. 21, 2002.

(51) Int. Cl.[7] .............................................. B29C 45/20
(52) U.S. Cl. .................. 425/549; 264/328.15; 425/572
(58) Field of Search ................................ 425/549, 572; 264/328.14, 328.15

(56) References Cited

U.S. PATENT DOCUMENTS 4,034,952 A 7/1977 Stewart
4,039,952 A 8/1977 Huntley
4,266,723 A 5/1981 Osuna-Diaz
4,273,525 A 6/1981 Reitan
4,309,163 A 1/1982 Cottancin
4,563,149 A 1/1986 Landis
4,593,182 A 6/1986 Schwarzkopf
4,666,396 A 5/1987 Landis
4,882,469 A 11/1989 Trakas
5,032,078 A * 7/1991 Benenati ..................... 425/549
5,213,824 A 5/1993 Hepler
5,324,191 A 6/1994 Schmidt
5,334,006 A 8/1994 Hepler et al.
5,505,613 A 4/1996 Krummenacher
5,853,631 A * 12/1998 Linehan ................. 264/328.14
5,955,120 A 9/1999 Deissler
6,095,789 A 8/2000 Hepler et al.
6,302,680 B1 * 10/2001 Gellert et al. ............... 425/549

* cited by examiner

*Primary Examiner*—Tim Heitbrink
(74) *Attorney, Agent, or Firm*—Francis J. Caufield

(57) ABSTRACT

A hot sprue bushing is provided for transporting plasticized material from an injection nozzle to a mold cavity while controlling the temperature of the plasticized material. The hot sprue bushing has an elongate body having an inlet end for receiving the plasticized material, an outlet end for discharging the material, and a through passage for transporting plasticized material therethrough. The body also has first and second surfaces on opposed sides of the through passage and electrical heating means disposed adjacent the first and second surfaces respectively, the electrical heating means extending along at least a major portion of the length of the elongate body. Finally, the bushing has retaining means for retaining the first and second electrical heating means adjacent the first and second surfaces respectively and in heat conducting relationship therewith.

14 Claims, 5 Drawing Sheets

HOT SPRUE BUSHING

CROSS REFERENCE TO RELATED APPLICATION

This application claims the benefit of priority from U.S. Provisional Patent Application No. 60/390,485 filed on Jun. 21, 2002 in the name of Douglas C. Hepler and bearing the title HOT SPRUE BUSHING, the entire contents of which are incorporated herein by reference.

FIELD OF THE INVENTION

This invention in general relates to the field of injection molding and in particular to hot sprue bushings for conveying melted plastic from a nozzle to a mold cavity gate or runner system.

BACKGROUND OF THE INVENTION

In plastic injection molding processes, a thermoplastic or thermoset molding compound is first heated to plasticity in an injection cylinder at controlled temperature. Afterwards, the plasticized compound is forced from the cylinder through a nozzle by means of pressure generated within the cylinder. On emerging from the nozzle, the plasticized compound is conveyed through a hole in a mold plate, usually stationary, by means of a sprue bushing (sprue for short) into the runner system or gate of the mold cavity. Once in the cavity, the resin assumes the shape of the cavity and is then cooled to the point where it is sufficiently solidified to retain the desired cavity shape. The mold is then opened, and the part is ejected or otherwise removed. The entire process is usually automated with the clamping of the mold parts prior to injection, and unclamping for part ejection or removal after cooling, taking place under the control of a microprocessor or other form of automated controller. Machines are rated by the number of ounces they will inject per piston or screw stroke and by the square inches of working area that can be clamped against injection pressure. Consequently, a machine can be used to fabricate a variety of different sized parts up to its maximum capacity. This is accomplished by using, among other things, plates of suitable thickness for the part at hand; large working areas and high injection pressures calling for robust mold plates to mount and sustain the large stresses created during the molding cycle. Plates used to make small parts, on the other hand, can be scaled down in size in accordance with the reduced stresses generated while molding them. Parts between the largest and smallest obviously require intermediate sized plates, and the industry has adopted standard plate thicknesses to promote productivity.

For best process performance regardless of part size, it is known to be beneficial to keep the temperature of the plasticized compound more or less constant throughout its travel to the cavity. This reduces process problems associated with material degradation due to thermal variability, improves yield by decreasing scrap losses, and increases machine production time by reducing down time due to freeze offs.

However, while standardized in many respects, particularly with respect to mold base or plate thicknesses, present molding machinery does not always provide for precise temperature control to take advantage of its beneficial effects. Indeed, much of the available machinery is still run employing cold sprue bushings which allow the temperature of the resin to be poorly controlled from the time it leaves the nozzle until it reaches a zone in the mold where temperature control is reacquired with, for example, internal heating channels in the mold.

More sophisticated practice, apparently not yet universally accepted, recognizes the advantages of controlling temperature by employing hot sprue bushings to convey material from the nozzle to the cavity gate, often times through the fixed mold plate, sometimes referred to as the "A" plate or base. A variety of approaches for providing heat in these hot sprue bushings have been used. Among these are the use of resistive heating elements and heat pipes such as those described in U.S. Pat. No. 4,034,952 entitled "HOT PLASTIC INJECTION BUSHING" issued on Jul. 12, 1977. In the latter case, the heat pipes are used to transfer heat from electrically powered heater bands located at the nozzle end of the sprue bushing to regions along the bore near the tip.

U.S. Pat. No. 5,213,824 entitled "ADJUSTABLE HOT SPRUE BUSHING" issued on May 25, 1993, and assigned to the same assignee as the present application, describes a hot sprue bushing of adjustable drop length so that it can be used in injection molding machines with a full range of different mold plate thicknesses to transport plasticized material from injection nozzles to mold cavities while controlling the temperature of the plasticized material. This hot sprue bushing comprises an elongate body having a head, a stem and a tip; the head has a reference seating surface which faces the tip. The elongate body has a through bore passing from end to end through the head, stem and tip of the body for transporting plasticized material through the sprue bushing from the head to the tip thereof. The body also has at least one non-through bore extending alongside the through bore, in heat conducting relationship with respect thereto; the non-through bore extending from the head through the stem and into the tip but is shorter than the elongate body. The, or each, non-through bore receives an electrically powered heating cartridge for controlling the temperature of the plasticized material as it travels along the through bore. In a preferred form of this hot sprue bushing, the body contains yet another bore which receives and positions a thermocouple substantially at the tip of the elongate body for controlling the temperature of the through bore over its full length.

Adjustment of the drop length of the hot sprue bushing is effected by means of a changing means manually positionable against the reference seating surface of the head and between this reference seating surface and the tip for shortening the initial drop length of the elongate body. This changing means has a mold plate seating surface selectively locatable over a predetermined range of distances between the reference seating surface and the tip to change the drop length of the hot sprue bushing, the changed drop length of the hot sprue bushing corresponding to the distance between the mold plate seating surface of the changing means and the tip. The hot sprue bushing may also have a cap which removably attaches to the head and has a recess having a shape complementary to that of standard injection nozzle shapes.

The adjustable hot sprue bushing of U.S. Pat. No. 5,213,824 gives good control of the temperature of the plasticized materials passing therethrough and is in commercial use. However, because the body of this hot sprue bushing needs to accommodate the through bore for the plasticized material, one or more bores, one for each heater cartridge, and the bore for the thermocouple, the body needs to be of substantial cross-section, and thus has a high thermal mass. This high thermal mass requires substantial heat input from the heater cartridges to maintain the proper operating temperature in commercial use, and thus the heater cartridges are subjected to a heavy-duty cycle, which reduces the working life of the heater cartridges. Such cartridge failure results in substantial down time of the of the injection molding machine, since it is necessary to disassemble the hot sprue bushing in order to replace the failed heater cartridge. It has also been found that, in commercial use, the cap of the hot sprue bushing is easily damaged and detached from the head. Finally, in the hot sprue bushing of U.S. Pat. No. 5,213,824, the wiring for the heater cartridges emerges from the bushing on a bracket secured to the cap of the bushing, and thus immediately adjacent the injection nozzle, in which location the wiring is somewhat susceptible to damage.

U.S. Pat. No. 6,095,789 entitled "ADJUSTABLE HOT SPRUE BUSHING" issued on Aug. 1, 2000, and assigned to the same assignee as the present application, describes a hot sprue bushing comprising an elongate body having a head, a stem and a distal end portion, and a through passage extending from end to end through the head, stem and distal end portion of the body for transporting plasticized material from the heat to the distal end portion. The distal end portion bears a first engaging device, and the head is of greater cross-section than the stem so that the head provides a first abutment surface extending outwardly of the stem. An electrically powered heater is wrapped around the stem of the head in heating conducting relationship. A sleeve surrounds the electrically powered heater; and a tip member has a second engaging device engaged with the first engaging device on the distal end portion, the tip member having a second abutment surface engaged with one end of the sleeve so as to urge the opposed end of the sleeve into engagement with the first abutment surface on the head. The tip member permits egress of plasticized material from the through passage in the body.

The hot sprue bushing of U.S. Pat. No. 6,095,789 provides control of the temperature of the plasticized materials passing therethrough, and has a desirably lower thermal mass so that the heater of the bushing can be operated at a low duty cycle, and thus with an improved working lifetime, as compared with the heater cartridges used in U.S. Pat. No. 5,213,824. Also, the hot sprue bushing of U.S. Pat. No. 6,095,789 permits location of a thermocouple adjacent the tip of the body for controlling the temperature of the through bore over its full length, while still allowing adjustment of the drop length of the hot sprue bushing, and allowing the wiring for the hot sprue bushing to emerge from the injection molding machine at a point spaced from the bushing, thereby rendering this wiring less susceptible to damage.

However, there is a trend in the injection molding industry towards the use of multiple bushing assemblies comprising a large number of hot sprue bushings fed from a single source of heated plastic material. In such multiple bushing assemblies, it is desirable that keep the cross-section of the individual bushings as small as possible in order to accommodate the maximum number of bushings within an assembly of given size and/or to provide maximum freedom in varying the number of bushings in the assembly. Since one broken or malfunctioning bushing may also render the entire assembly unusable, it is important that individual bushings can be removed and accurately relocated within the assembly. Since the tips of the bushings are subject to the most rapid wear, the bushing should provide for rapid removal and replacement of the tips. The individual bushings should be adapted to be fed from the single source of heated plastic material without requiring excessive lengths of piping, and in practice the easiest way to arrange this is to have the individual bushings fed from spaced lines of ports through which the plastic material is supplied.

Viewed against these criteria regarding suitability for use in multiple bushing assemblies, the hot sprue bushing of U.S. Pat. No. 6,095,789 has certain disadvantages. One disadvantage is the rather large cross-section of the bushing relative to the cross-section of the body. In the specific embodiment shown in the drawings of this patent, the length adjusting member has the form of a hollow cylinder having an internal thread which engages an external thread on the body of the bushing. The diameter of the length adjusting member is approximately twice that of the body, which requires a larger than desirable spacing between adjacent bushings in a multiple bushing assembly. Replacement of the tip of the bushing requires removal of the tip member, which in turn releases the sleeve and thus removes the compression on the heater. Thus, after replacement of the tip, the bushing must be carefully reassembled to ensure that the heater is not accidentally damaged. Finally, because adjustment of the drop length of the bushing is effected by moving the whole body relative to the length adjusting member, varying the drop length of the bushing also varies the position of the inlet end of the through passage relative to the surface on which the length adjusting member is mounted. If such a bushing is used in a multiple bushing assembly and it is desired to use different drop lengths for different bushings of the assembly (as is commonly the case where the assembly is used to make a plurality of different types of moldings simultaneously), the varying positions of the inlet ends of the through passages lead to problems in arranging the piping to supply heated plastic material to these inlet ends; either inconvenient flexible piping must be used or equally inconvenient arrangements must be made to allow for variation of the positions of the nozzles used to supply material to the inlet ends.

It is an object of the present invention to provide a hot sprue bushing which retains the ability of the hot sprue bushing of U.S. Pat. No. 6,095,789 to supply heat to the plastic material over essentially the full length of the bushing, but which is better adapted for use in multiple bushing assemblies.

It is a further object of the present invention to provide a hot sprue bushing which can readily be removed and replaced in a multiple bushing assembly, with minimal risk of damage to the heating element of the bushing.

It is a further object of the present invention to provide a hot sprue bushing which permits multiple bushings to be fed in a convenient manner from a single source of heated plastic material.

Other objects of the invention will be apparent and will appear hereinafter in the following detailed description when read in connection with the drawings.

SUMMARY OF THE INVENTION

This invention provides a hot sprue bushing for transporting plasticized material from one or more ports to a plurality of mold cavities generally arranged in one or two-dimensional arrays while controlling the temperature of the plasticized material. The hot sprue bushing of the invention comprises an elongate body having a material inlet end for receiving the plasticized material and an outlet end for discharging the material. A through passage extends through the body from its inlet end to its outlet end for transporting plasticized material therethrough, the body having at least first and second surfaces on opposed sides of the through passage. The bushing further comprises electrical heating means disposed adjacent the first and second surfaces respectively, the electrical heating means extending along at least a major portion of the length of the elongate body. Finally, the bushing comprises retaining means for retaining the electrical heating means adjacent the first and second surfaces, respectively, and in heat conducting relationship therewith.

The placement of the electrical heating means in the present hot sprue bushing allows for control over the temperature of the plasticized material while allowing a compact design very suitable for use in arrays of multiple bushing assemblies.

In a preferred form of the hot sprue bushing of the present invention, the body is in two sections, a main section having the through passage extending therethrough, and a tip section releasably retained within the outlet end of the through passage. With this two-part body, the drop length of the bushing can be varied by replacing the tip section with one of different length, and, as will be apparent from the description of the preferred form of the invention given below, the hot sprue bushing can be designed to make such tip replacement quick and easy. Furthermore, this two-part body concentrates in the replaceable tip member the wear on the bushing caused by passage of plasticized material therethrough, and permits a worn tip member to be readily replaced. In addition, each body has integrally formed therewith a pair of opposed load bearing shoulders or pedestals that operate to carry a substantial part of the load imposed by mold plates and to locate a bushing accurately within a mold assembly.

BRIEF DESCRIPTION OF THE DRAWINGS

The structure and operation of the hot sprue bushing of the present invention, together with other objects and advantages thereof, may best be understood by reading the detailed description in connection with the drawings in which unique reference numerals have been used throughout for each part and wherein.

DETAILED DESCRIPTION OF THE INVENTION

Figure 1:
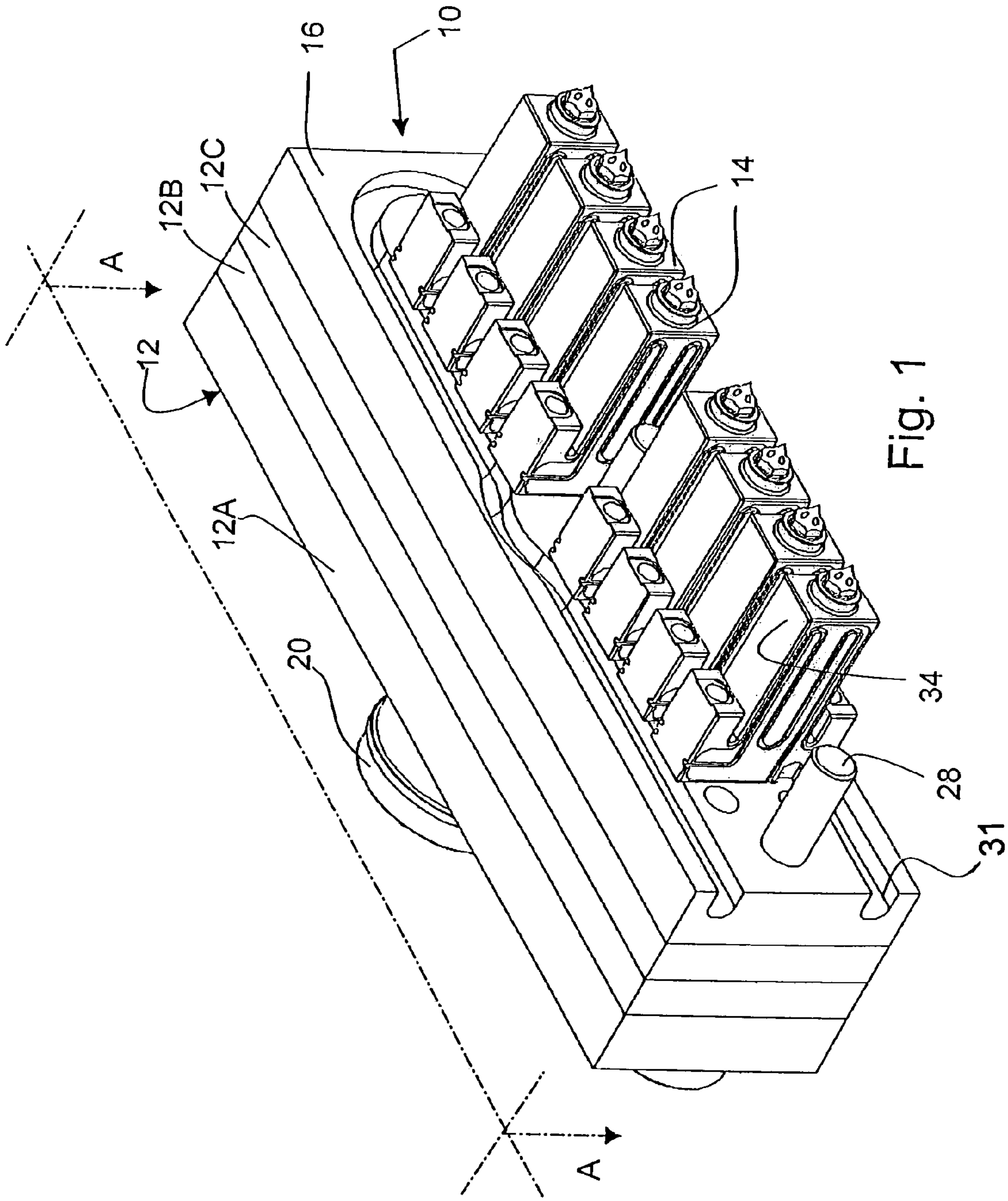
FIG. 1 is a three-quarter, diagrammatic perspective view of a hot sprue bushing assembly of the present invention taken from the side of the assembly which in use faces the a cavity assembly (certain parts are omitted from FIG. 1 to show the constructions of the bushings used in the assembly)
Figure 2:
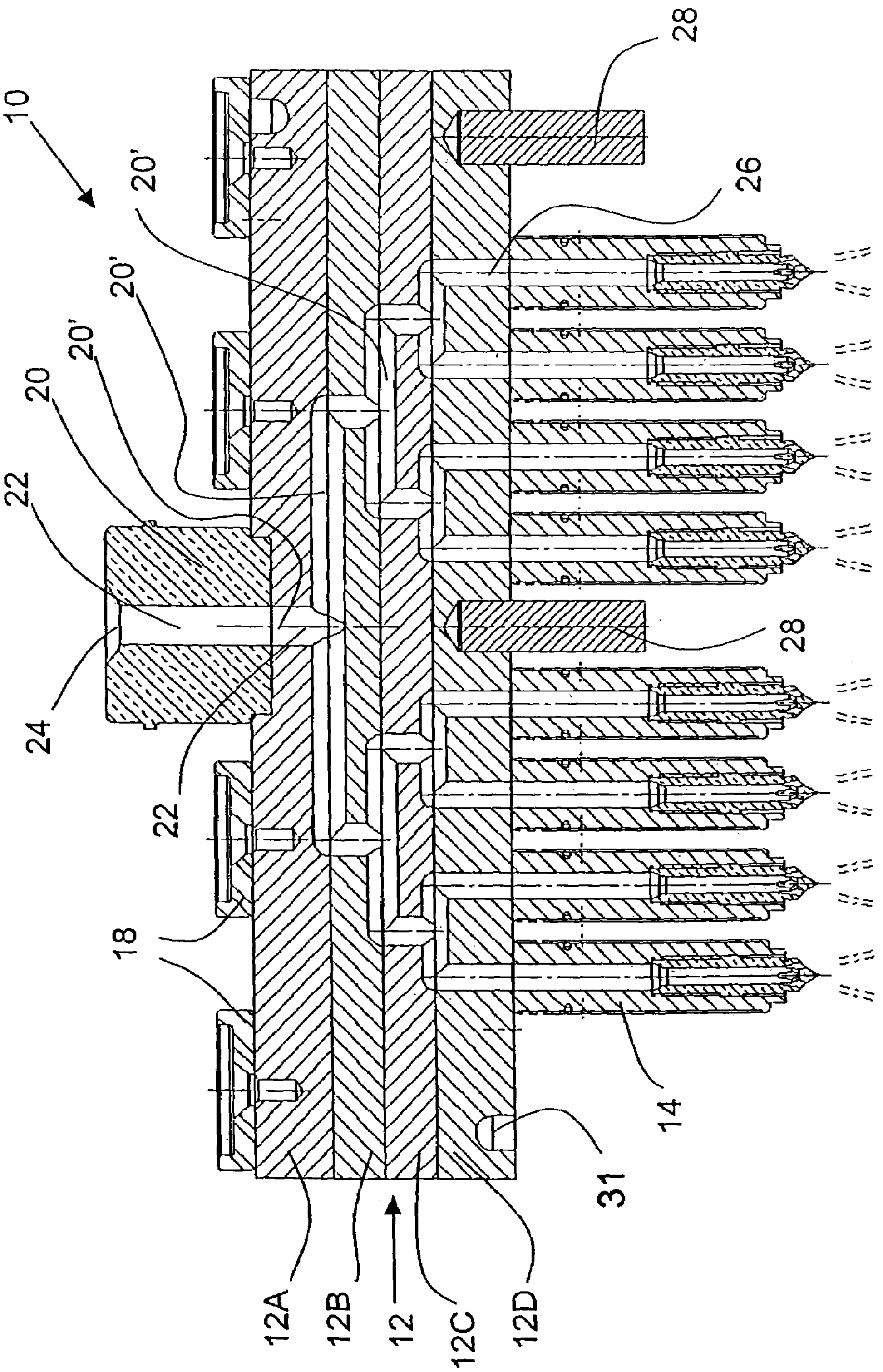
FIG. 2 is a diagrammatic section along the line A—A in FIG. 1 in the plane which includes the axes of the bushings.

FIGS. 1 and 2 show a preferred hot sprue bushing assembly (generally designated 10) of the present invention. The assembly 10 comprises a single manifold (generally designated 12) and a plurality of hot sprue bushings 14 mounted on one surface 16 (for convenience hereinafter referred to as the lower surface, although the assembly 10 can be used in any orientation) of the manifold 12. Eight bushings 14 are shown, although this number can obviously vary widely depending upon the intended size and production capacity of assembly 10.

As best seen in FIG. 2, the manifold 12 is provided on its upper surface with support pillars 18 and with a substantially cylindrical nozzle interface 20 having a central main feed channel 22. The upper end of main feed channel 22 has a flared section 24 which accommodates a feed nozzle (not shown) through which plasticized material is fed into the manifold 12 when the bushing assembly 10 is in use. The manifold 12 is formed from four rectangular manifold laminate plates, designated 12A–12D respectively, each of which is provided with one or more hemicylindrical recesses on its major surfaces and one or more bores extending therethrough, these recesses and bores together forming a channel system the details of which will be apparent from FIG. 2.

Essentially, the main feed channel 22 in the nozzle interface 20 continues as a single bore 20' extending through the plate 12A, but this bore 20' undergoes three successive bifurcations at the interfaces between adjacent pairs of plates 12A/12B, 12B/12C and 12C/12D, to provide eight separate nozzle feed channels 26, each of which supplies plasticized material to a corresponding one of the bushings 14. Two cylindrical locator dowels 28 (only one shown) are secured in the plate 12D; these dowels 28 fit into corresponding cylindrical recesses (not shown) in the mold assembly 30 (see FIG. 3) to locate the assembly 10 accurately at a predetermined position within the mold assembly 30. A groove 31 (FIG. 1), which is essentially U-shaped and substantially semicircular in cross-section, extends around the periphery of the lower surface 16 of the manifold 12, extending around the bushings 14.

The detailed construction of the hot sprue bushings 14 will now be described with reference to FIGS. 1, 2, 4 and 5. Each bushing 14 comprises an elongate body section 32 which is of substantially rectangular cross-section, having a material inlet end (shown to the left in FIG. 1, to the top in FIGS. 2 and 5 and to the right in FIG. 4) through which the plasticized material from the manifold 12 enters the bushing 14, and an opposed outlet end for discharging this material. The body section 32 has a through passage 36 extending from its inlet end to its outlet end to allow passage of the plasticized material through the bushing 14; as best seen in FIG. 5 and as described in detail below, the passage 36 has an inlet section 36A of one diameter and an outlet section 36B of larger diameter, a tip member (described below) being accommodated within the outlet section 36B.

Each body section 32 also has two lateral extensions 38 through which pass bores 40. Bushing locator dowels 42 are inserted through the bores 40 and into cylindrical recesses (not shown) in the lower surface 16 of the manifold 12 to hold each bushing 14 accurately in a predetermined position on the surface 16, this predetermined position being arranged to align the inlet end of the passage 36 of the bushing 14 with the nozzle feed channel 26 (FIG. 2). Alternatively, one of the body section 32 and the surface 16 could be provided with at least one projection, and the other with at least one cooperating recess, and the projection(s) being inserted into the recess(es) to locate the bushing 14 in a predetermined position on the surface 16.

Figure 4:
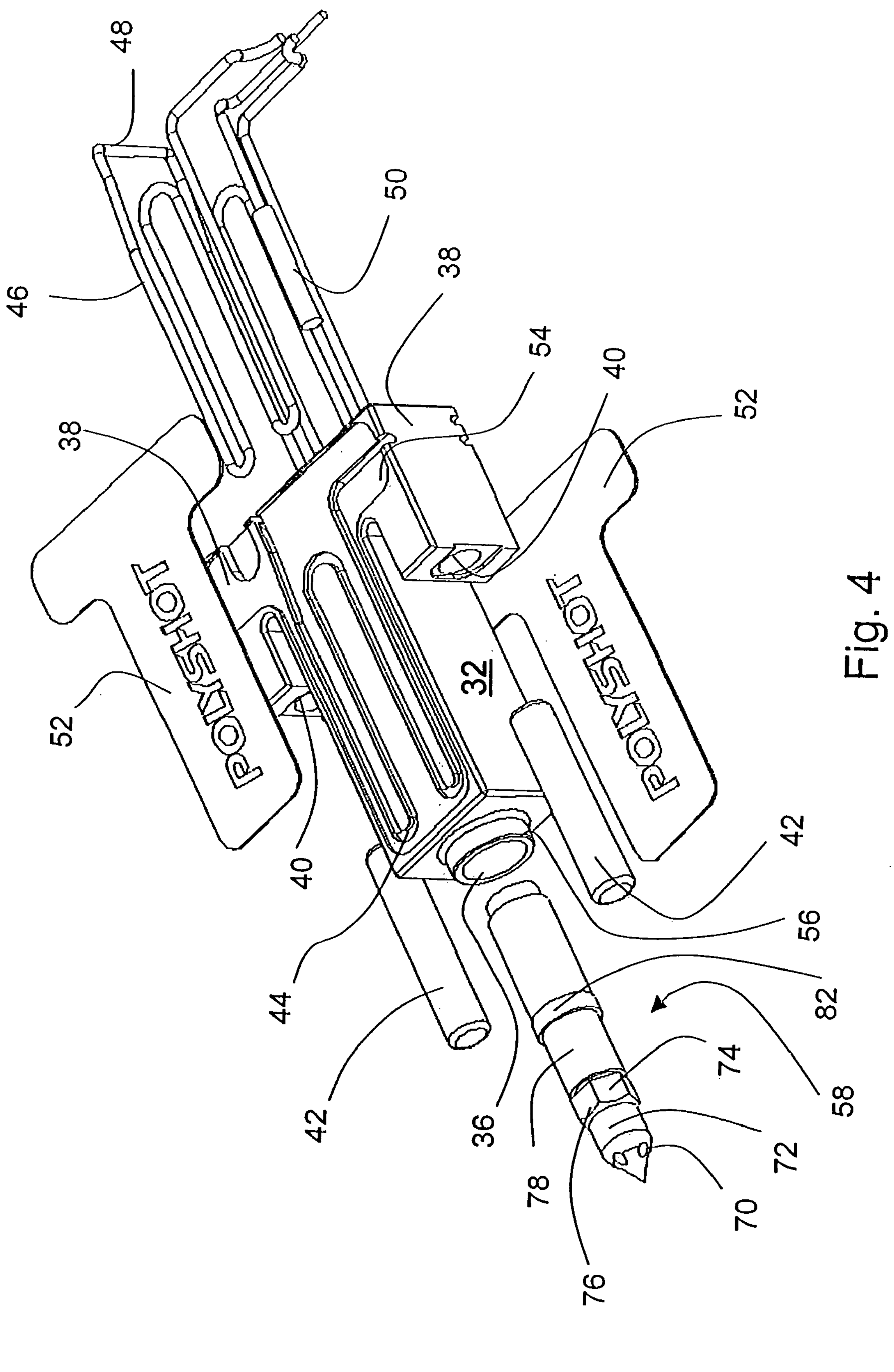
FIG. 4 is a diagrammatic exploded view showing various components of one of the bushings shown in FIGS. 1 to 3.
Figure 5:
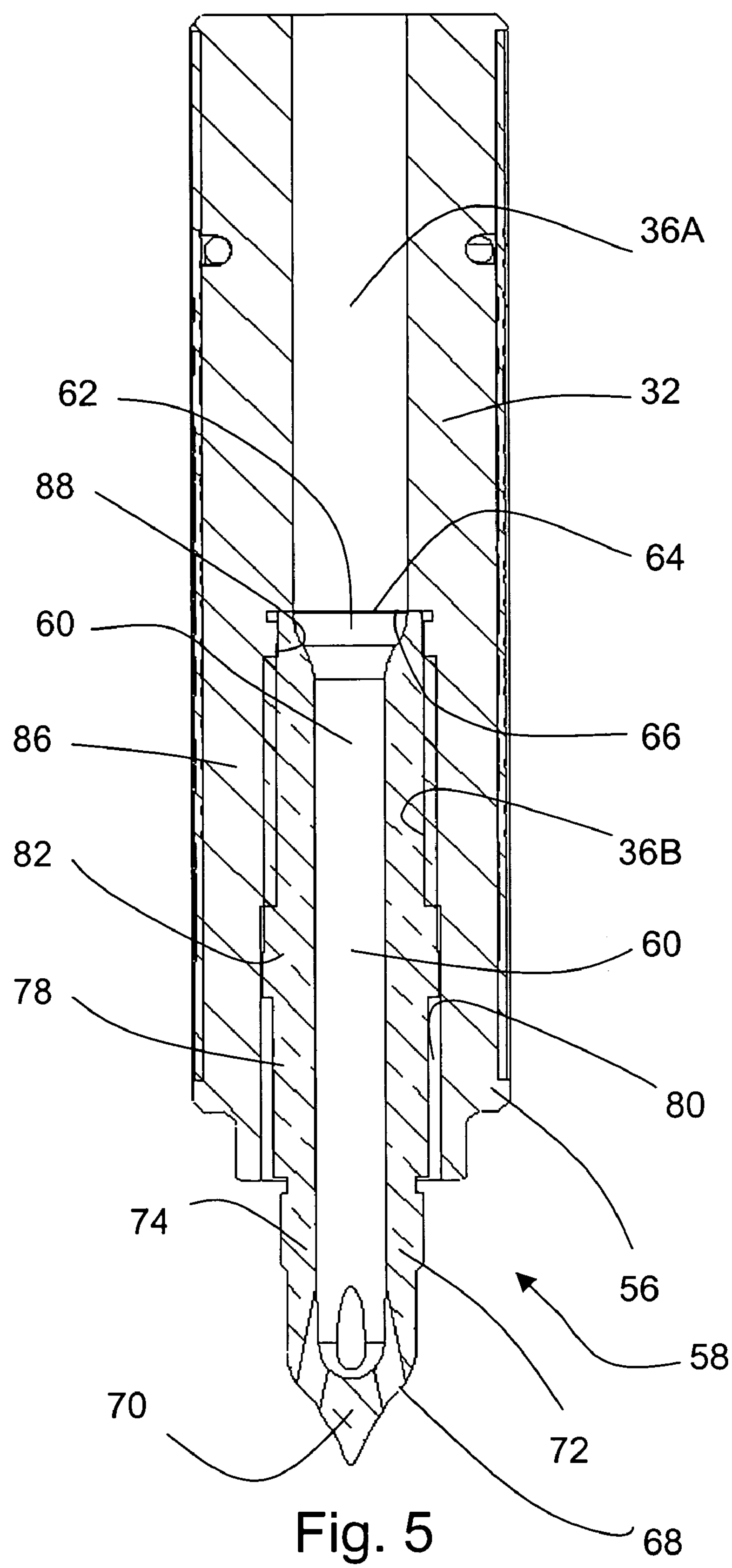
FIG. 5 is an enlarged section, taken in the same plane as FIG. 2, through one of the bushings shown in FIGS. 1 to 3.

One pair of opposed surfaces of each body section 32 are provided with serpentine grooves 44 in which are accommodated electrical heating elements 46; as shown in FIG. 4, the heating elements on the two surface may be continuous or interconnected by a connector 48 which is accommodated within a groove (not shown) on one end surface of the body section 32. The size, length, and shape of the heating element 46 is chosen so that the heating element grips and presses upon the body section 32 when placed around this body section, so that the heating elements 46 are held within the grooves 44. A thermocouple 50 is provided adjacent a portion of the heating element 46 and is accommodated within a separate groove (not shown). The heating element 46 iw also retained within the grooves 44 and in heat conducting relationship with the body section 32 by flat, T-shaped heater retainer plates 52 that are pressed into complemenatry configured recesses. It will be seen from FIG. 4 that each of the surfaces of the body section 32 bearing the grooves 44 is also provided with a shallow recess 54 conforming to the shape of the plates 52. The heater retainer plates 52 and the heating element 46 are omitted from FIG. 1 to show the surfaces of the bushings 14 on which the heating element 46 is provided; note that the heating element 46 is provided on the surfaces of the bushings 14 which face adjacent bushings, i.e., the heating element is disposed in the gaps between adjacent bushings. This placement of the heating element 46 minimizes the risk of damage to heating elements as the bushing assembly 10 is connected to the mold assembly 30.

The outlet section 36B of the passage 36 in the body section 32 is surrounded by a upstanding collar 56, and into this outlet section 36B is inserted a tip member (generally designated 58). As shown in FIG. 5, this tip member 58 has a passage 60 extending therethrough and communicating with the passage 36 in the body section 32. Since the passage 60 is of smaller diameter than the inlet section 36A of passage 36, the passage 60 is provided with a flared section 62 to provide a smooth transition between the two passages. The body section 32 has an annular abutment surface 64 at the junction between the inlet section 36A and the outlet section 36B, and this abutment surface 64 coacts with an abutment surface 66 on the upper end of the tip member 58 to limit movement of the tip member into the passage 36 in the body section 32. The exposed end of the tip member 58 is provided with three symmetrically spaced bores 68 which communicate with the passage 60 and through which the plasticized material leaves the bushing 14.

As best seen in FIGS. 4 and 5, the tip member 58 has a somewhat complex form, having an substantially conical end section 70 through which the bores 68 emerge, and, adjacent the conical end section 70, a first cylindrical section 72. The next section of the tip member 58 is a hexagonal prismatic section 74, the faces 76 of which provide wrench flats to which a wrench can be applied to insert the tip member 58 into the passage 36 in the body section 32. The hexagonal section 76 is joined via a short transition section to a second cylindrical section 78, which is of smaller diameter than the portion of the outlet section 36B within which it lies, and the annular cylindrical space left between the cylindrical section 78 and the surrounding wall of the outlet section 36B is filled with a thermal barrier material 80. The cylindrical section 78 extends from a position between the heating elements 46 to a position below these heating elements, and the provision of the thermal barrier material 80 helps to prevent variation in temperature of the plasticized material within the bushing 14.

Above the cylindrical section 78, the tip member 58 is provided with a threaded section 82, the thread of which is engaged with an internal thread on the surrounding wall of the outlet section 36B of the passage 36, thus holding the tip member 58 firmly in position within the body section 32; it is of course necessary that the tip member 58 be held firmly in position or else it might be blown out of the body section 32 under the pressure of the plasticized material. Finally, the tip member 58 comprises a third cylindrical section 86, which fits snugly within the outlet section 36B, and an upper section 88 which carries the abutment surface 66.

It will be apparent from the foregoing description that the tip member 58 is designed to be readily removed from and replaced within the body section 32. To place the tip member 58 in its operating position, as shown in FIGS. 1, 2, 3 and 5, the tip member is simply inserted within the body section 32, conveniently with the body section inverted, and a wrench is applied to the wrench flats 76 to advance the tip member into the body section until the abutment surfaces 64 and 66 contact each other. The tip member 58 is removed from the body section 32 in a similar manner using a wrench. The ready insertion and removal of the tip member 58 not only allows replacement of worn or damaged tips with minimal downtime, but also permits a variety of tip members 58 to be used with a single manifold 12; these tip members can vary in drop length and, for example, in the diameter and form of the passageway 60 and the bores 68 to optimize the performance of the bushing 14 for use with differing types of plasticized materials.

Figure 3:
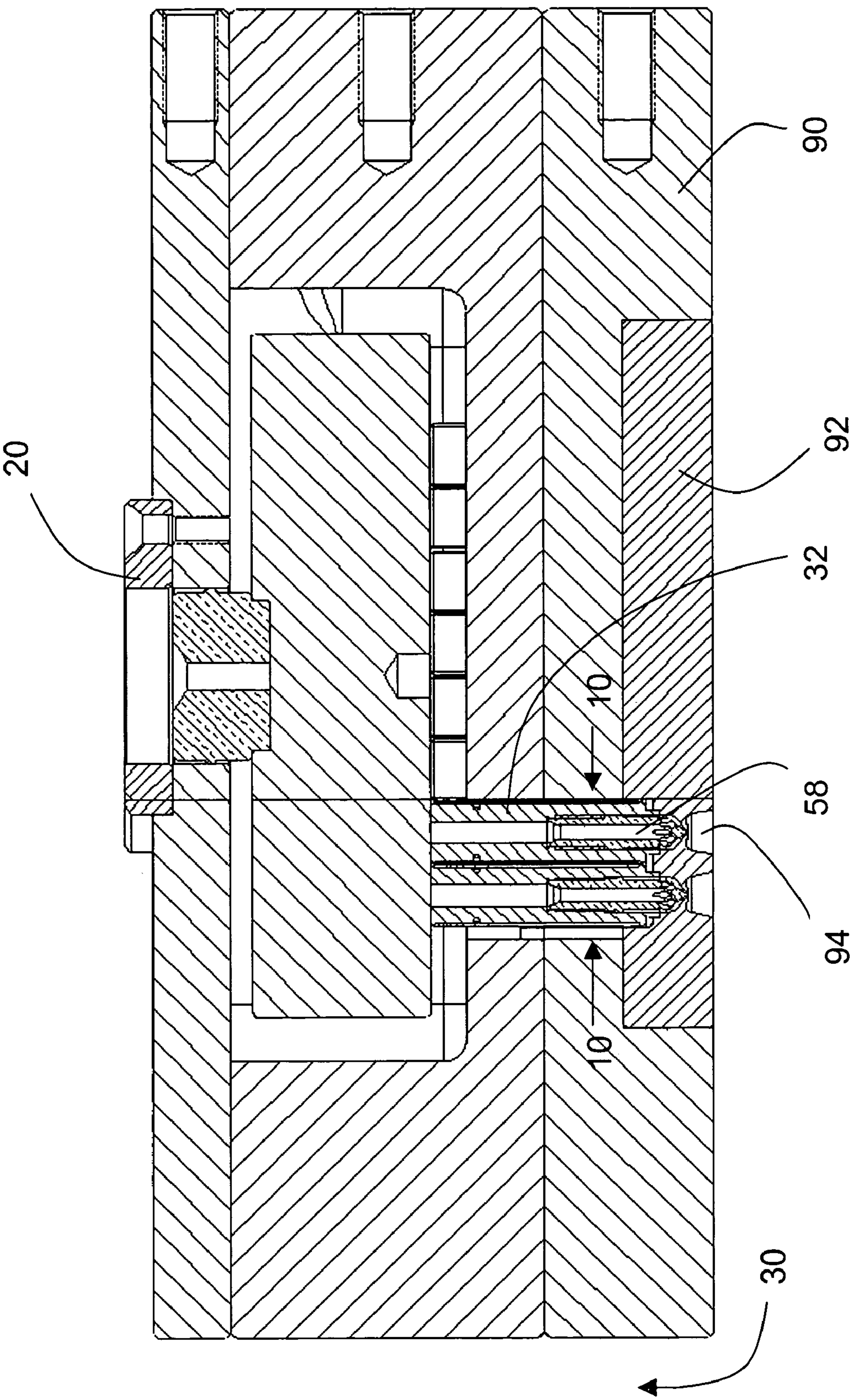
FIG. 3 is a diagrammatic sectional elevational view of an array of hot sprue bushing assemblies like those of FIG. 1 shown stacked together in side-by-side fashion to form a two-dimensional bushing array.

FIG. 3 of the accompanying drawings illustrates a plurality of bushing assemblies 10 positioned side-by-side in a mold assembly 30 to form a 2D array of bushings to service a corresponding 2D array of cavities. As already mentioned, the bushing assembly 10 is held in a predetermined position in the mold assembly 30 by inserting the dowels 28 (FIG. 2) into corresponding recesses (not shown) in the mold assembly 30. The mold assembly 30 comprises a face plate 90 and a cavity block 92, in which are formed a plurality of mold cavities 94 arranged in a 2D array. As shown in FIG. 3, the bushings 14 extend through bores in the face plate 90 and the cavity block 92 such that the bores 68 (FIG. 5) in the end sections 70 of the tip members 58 communicate with the interior of the mold cavities 94 and supply plasticized material thereto.

It will readily be apparent to those skilled in the art that numerous changes and modifications can be made to the preferred hot sprue bushing described above without departing from the scope of the invention. For example, the tip member can assume a wide variety of forms so that the passageway through the tip member may have a form corresponding to any of the numerous forms of tip conventionally used in the injection molding art.

Those skilled in the art may make other changes to the invention without departing from the scope of its teachings. Therefore, it is intended that the embodiments described herein be considered as illustrative and not be construed in a limiting sense.

From the foregoing, it will be seen that the present invention provides a hot sprue bushing which provides temperature control of plasticized materials passing therethrough similar to that of the bushing described in the aforementioned U.S. Pats. Nos. 5,213,824 and 6,095,789. However, the present bushing has a smaller cross-section than the bushing described in the latter patent and is thus more suitable for use in multiple bushing assemblies. The preferred embodiment of the invention described above permits rapid and easy replacement of worn or damaged tip members, thus minimizing downtime of a molding apparatus using the bushing assembly. The preferred embodiment also permits rapid and easy replacement of the heating elements and thermocouple when necessary, and minimizes the risk of damage to the heating elements as the bushing assembly is placed upon, or removed from, a mold assembly.

What is claimed is:

1. A hot sprue bushing for transporting plasticized material from a port on a manifold having forward and lateral flow paths to a mold cavity while controlling the temperature of the plasticized material, the hot sprue bushing comprising:

an elongated body adapted to be arranged substantially perpendicular to said manifold lateral flow path, said elongated body having a material inlet end for receiving the plasticized material and an outlet end for discharging the material, said elongated body having a through passage extending therethrough from its inlet end to its outlet end for transporting plasticized material therethrough, said elongated body having an oblong cross-sectional shape in a direction perpendicular to said manifold lateral flow path and at least first and second surfaces on opposed sides of said through passage wherein said cross sectional shape of said elongated body is smallest in a direction parallel to said manifold lateral flow path;

first and second continuous electrical resistance heaters disposed on said first and second surfaces respectively, said first and second continuous electrical resistance heaters each extending along at least a major portion of the length of said elongated body along a path having multiple reversing loops; and retaining means for retaining said first and second continuous electrical resistance heaters adjacent said first and second surfaces respectively and in heat conducting relationship therewith.

2. A hot sprue bushing according to claim 1 wherein the first and second surfaces are each provided with at least one recess whose shape complements that of said multi-looped path, said first and second continuous electrical resistance heaters being accommodated within said at least one recess on their associated surface.

3. A hot sprue bushing according to claim 2 wherein said retaining means have substantially the form of flat plates releasably secured to said first and second surfaces.

4. A hot sprue bushing according to claim 1 wherein said elongated body is of substantially rectangular cross-section perpendicular to said manifold lateral flow pathe, and said first and second surfaces form one of said opposed pairs of surfaces of said rectangular elongated body.

5. A hot sprue bushing according to claim 1 wherein said elongated body comprises a main section having said through passage extending therethrough, and a tip section releasably retained within said outlet end of said through passage.

6. A hot sprue bushing according to claim 5 wherein said main section and said tip section are provided with first and second abutment surfaces respectively, said first and second abutment surfaces being arranged to contact each other as said tip section is inserted into said main section, thereby limiting the movement of said tip section into the main section.

7. A hot sprue bushing according to claim 1 further comprising a thermocouple disposed within the elongated body for sensing the temperature of the elongated body.

8. A hot sprue bushing assembly comprising at least one hot sprue bushing according to claim 1 and a manifold on which said at least one hot sprue bushing is mounted, said manifold having plurality of material feed channels for supplying plasticized material to the said through passage of said at least one hot sprue bushing.

9. A hot sprue bushing assembly according to claim 8 wherein said at least one hot sprue busing is provided with locating means for locating said at least one hot sprue bushing in a predetermined location on said manifold.

10. A hot sprue bushing assembly according to claim 9 wherein said locating means comprises a projection on one of said hot sprue bushing and said manifold and a recess on the other of said hot sprue bushing and said manifold.

11. A hot sprue bushing assembly according to claim 9 wherein said locating means comprises an aperture extending through part of said hot sprue bushing, a recess in said manifold and a locating member which can be inserted through said aperture in said hot sprue bushing into said recess in said manifold to retain said hot sprue bushing in a predetermined location on said manifold.

12. A hot sprue bushing assembly according to claim 8 comprising at least two hot sprue bushings according to claim 4, said hot sprue bushings being arranged with at least one of said first and second surfaces of said one bushing facing an adjacent one of said other bushing.

13. A hot sprue bushing assembly according to claim 8 comprising at least two hot sprue bushings according to claim 1, said manifold having a manifold heating element.

14. A hot sprue bushing assembly according to claim 8 comprising at least two hot sprue bushings according to claim 1, said manifold having a single inlet and walls defining passageways connecting said single inlet to a plurality of outlet ports disposed adjacent said through passageways of said hot sprue bushings.

* * * * *